US012559580B2

(12) United States Patent
Martins Junior et al.

(10) Patent No.: US 12,559,580 B2
(45) Date of Patent: Feb. 24, 2026

---

(54) PROCESS FOR INTRODUCING CATALYST IN A POLYMERIZATION PROCESS

(71) Applicant: Braskem S.A., Camaçari (BR)

(72) Inventors: Olavo Martins Junior, São Paulo (BR); Dihogenes Adriano Pozzer, São Paulo (BR); Élita Cavalli, São Paulo (BR)

(73) Assignee: Braskem S.A., Camaçari (BR)

( * ) Notice: Subject to any disclaimer, the term of this patent is extended or adjusted under 35 U.S.C. 154(b) by 0 days.

(21) Appl. No.: 18/516,217

(22) Filed: Nov. 21, 2023

(65) Prior Publication Data

US 2024/0084054 A1    Mar. 14, 2024

Related U.S. Application Data

(63) Continuation of application No. 16/728,772, filed on Dec. 27, 2019, now Pat. No. 11,866,522.

(60) Provisional application No. 62/785,748, filed on Dec. 28, 2018.

(51) Int. Cl.
| | |
|---|---|
| *C08F 2/02* | (2006.01) |
| *B01J 4/00* | (2006.01) |
| *B01J 19/18* | (2006.01) |
| *C08F 4/654* | (2006.01) |
| *C08F 10/06* | (2006.01) |
| *C08F 110/06* | (2006.01) |

(52) U.S. Cl.
CPC .............. *C08F 10/06* (2013.01); *B01J 4/001* (2013.01); *B01J 19/18* (2013.01); *C08F 2/02* (2013.01); *C08F 4/654* (2013.01); *B01J 2204/002* (2013.01)

(58) Field of Classification Search
CPC .............................. C08F 4/654; C08F 110/06
See application file for complete search history.

(56) References Cited

U.S. PATENT DOCUMENTS

| | | | |
|---|---|---|---|
| 4,077,904 | A | 3/1978 | Noshay et al. |
| 4,115,639 | A | 9/1978 | Brown et al. |
| 4,482,687 | A | 11/1984 | Noshay et al. |
| 4,543,399 | A | 9/1985 | Jenkins, III et al. |
| 4,564,605 | A | 1/1986 | Collomb-Ceccarini et al. |
| 4,721,763 | A | 1/1988 | Bailly et al. |
| 4,879,359 | A | 11/1989 | Chamla et al. |

(Continued)

FOREIGN PATENT DOCUMENTS

| | | |
|---|---|---|
| EP | 1094083 A2 | 4/2001 |
| EP | 1561762 A1 | 8/2005 |

(Continued)

OTHER PUBLICATIONS

International Preliminary Report on Patentability issued in corresponding International Application No. PCT/IB2019/039761; dated Jun. 16, 2021 (6 pages).

*Primary Examiner* — Catherine S Branch
(74) *Attorney, Agent, or Firm* — Osha Bergman Watanabe & Burton LLP

(57) ABSTRACT

Methods of adding a catalyst to a bulk polymerization process may include mixing the catalyst with propylene to form a catalyst mixture that is substantially free of any C20 or greater hydrocarbons, feeding the catalyst mixture into a polymerization reactor, activating the catalyst mixture; and performing a polymerization on the catalyst mixture in the polymerization reactor. Polymers may be formed by polymerization processes that are substantially free of any C20 or greater hydrocarbons.

11 Claims, 4 Drawing Sheets

(56)　　　　　References Cited

U.S. PATENT DOCUMENTS

| | | | |
|---|---|---|---|
| 4,900,741 | A | 2/1990 | Kohler |
| 6,262,191 | B1 | 7/2001 | Hottovy et al. |
| 6,916,892 | B2 | 7/2005 | Tharappel et al. |
| 6,936,226 | B2 | 8/2005 | Agapiou et al. |
| 8,178,050 | B2 | 5/2012 | Michielin et al. |
| 2004/0044148 | A1 | 3/2004 | Bidell et al. |
| 2004/0116625 | A1 | 6/2004 | Hottovy et al. |
| 2006/0264587 | A1 | 11/2006 | Sell et al. |
| 2007/0140934 | A1 | 6/2007 | Okamura et al. |
| 2007/0208147 | A1 | 9/2007 | Lee et al. |
| 2014/0088274 | A1 | 3/2014 | Ding et al. |
| 2015/0031842 | A1 | 1/2015 | Edwards et al. |
| 2020/0181297 | A1 | 6/2020 | Arakawa et al. |
| 2021/0317242 | A1 | 10/2021 | Vestberg et al. |

FOREIGN PATENT DOCUMENTS

| | | | |
|---|---|---|---|
| EP | 1803742 | A1 | 7/2007 |
| EP | 2070954 | A1 | 6/2009 |
| EP | 2083023 | A1 | 7/2009 |
| EP | 2813517 | A1 | 12/2014 |
| JP | H08183809 | A | 7/1996 |
| WO | 9628479 | A1 | 9/1996 |
| WO | 2001004166 | A1 | 1/2001 |
| WO | 2015107020 | A1 | 7/2015 |
| WO | 2017021454 | A1 | 2/2017 |
| WO | 2020231716 | A1 | 11/2020 |
| WO | 2021058607 | A1 | 4/2021 |

PROCESS FOR INTRODUCING CATALYST IN A POLYMERIZATION PROCESS

BACKGROUND

Polyolefins are generally produced by catalytic polymerization processes. There are a variety of methods described in the art for adding a catalyst to a polymerization process, but methods often rely upon the use of a non-polymerizable compound as a catalyst carrier.

For example, in some gas-phase olefin polymerization processes, supported catalysts may be carried by inert compounds that are used for other purposes, such as to control pressure and monomer concentration. For instance, U.S. Pat. No. 4,543,399 describes that injection with an inert gas, such as nitrogen or argon, can carry a catalyst to a reactor bed. U.S. Pat. No. 8,178,050 describes that a catalyst can be added gas-phase reactor using an inert compound, such as nitrogen or C2-C8 alkanes in either a gaseous or liquid state, to carry the catalyst into the gas-phase polymerization process. More particularly, U.S. Pat. No. 6,936,226 describes that a supported metallocene-type catalyst system can be delivered to a gas-phase reactor by a carrier solution that includes an antistatic agent and a liquid diluent. The liquid diluent may be olefins having 2 to 20 carbons or non-polymerizable hydrocarbons.

The methods discussed above are only effective when feeding unreactive catalyst powder into a gas-phase polymerization reactor, because the first contact between catalyst and monomer occurs before polymerization step. In these methods an activated catalyst may cause obstructions, particularly at the catalyst feed point of a gas-phase reactor, as activated catalyst could contact the monomer under uncontrolled conditions.

In an olefin slurry polymerization process, an activated catalyst may be fed by using a liquid diluent. These methods can effectively prevent any obstruction of the catalyst storage and feed processes as the initial contact between catalyst and monomer occurs only within the polymerization reactor under controlled conditions. For example, U.S. Pat. No. 6,262,191 describes that a dry catalyst is contacted with a diluent to wet the catalyst and produce a catalyst mud. Suitable diluents are well-known in the art and are taught to include hydrocarbons that are inert and liquid under reaction conditions, such as isobutane, n-butane, propane, n-pentane, 1-pentane, iso-pentane and n-hexane. The diluents can flush the catalyst mud into the slurry polymerization process.

In contrast to gas-phase and slurry polymerization processes, in an olefin bulk polymerization process there is not a non-polymerizable compound that is used to dilute the monomer concentration. This characteristic imposes a challenge to efficaciously feeding a catalyst into the polymerization process. Using an inert liquid carrier, such as in slurry processes, effectively dilutes the concentration of both catalyst and monomer, consequently decreasing both the catalyst activity and the monomer conversion. This results in an increase in production cost and a decrease in the efficiency of the process. Moreover, the use of an inert gas, such as nitrogen, may cause cavitation in the circulation loops.

As a solution, some processes utilize heavy compounds such as olefinic waxes and mineral oils. For example, PCT Application No. WO 2001/04166A1 describes that a catalyst can be pre-polymerized in the presence of a viscous substance, such as olefinic wax, to provide a pre-polymerized catalyst that is stable during storage and handling. This then enables easy dosing of the catalyst into a polymerization reactor. U.S. Pat. No. 6,916,892 describes that a Ziegler- Natta catalyst can be mixed with a high molecular weight mineral oil and then cooled to form a paste, which can be mixed with a cocatalyst and one or more electron donors and metered into a reactor by a pump. Another embodiment describes that a metallocene catalyst and cocatalyst can be mixed in a low molecular weight mineral oil and then introduced into a bulk polymerization reactor.

However, such methods introduce heavy hydrocarbons compounds into the polymerization process, requiring an additional processing step if they are to be removed. A low concentration of inert heavy compounds can be used to try to circumvent the necessity of this step, but when these heavy compounds are not removed they may be present in the final polymers. Additionally, they may detrimentally impact polymer processing by promoting smoke generation and/or necessitating additional equipment cleaning because of oil and wax accumulation.

Accordingly, there is a need for catalyst feeding methods that do not require an additional process step to remove heavy hydrocarbons from the polymerization, and can result in a polymerized product that is substantially free of C20 or heavier hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods of adding a catalyst to a bulk polymerization process that may include mixing the catalyst with propylene to form a catalyst mixture that is substantially free of any C20 or greater hydrocarbons, feeding the catalyst mixture into a polymerization reactor, activating the catalyst mixture; and performing a polymerization on the catalyst mixture in the polymerization reactor.

In another aspect, embodiments disclosed herein relate to polymers that are produced by methods that may include mixing the catalyst with propylene to form a catalyst mixture that is substantially free of any C20 or greater hydrocarbons, feeding the catalyst mixture into a polymerization reactor, activating the catalyst mixture; and performing a polymerization on the catalyst mixture in the polymerization reactor.

In another aspect, embodiments disclosed herein relate to systems for a bulk polymerization process that include a reactor in which a catalyst mixture is prepared, a catalyst feed that feeds a catalyst into the reactor, a propylene feed that feeds liquid propylene into the reactor, a bulk polymerization reactor, and a feeder that connects the reactor to the bulk polymerization reactor and feeds the catalyst mixture from the reactor into the bulk polymerization reactor.

Other aspects and advantages of the claimed subject matter will be apparent from the following description and the appended claims.

BRIEF DESCRIPTION OF DRAWINGS

FIGS. 4A-C depict apparatuses that can produce and activate a catalyst mixture, and subsequently feed the activated catalyst mixture into a polymerization process. FIG. 4D depicts an apparatus of one or more embodiments of the present invention that can produce a catalyst mixture and then feed it into a polymerization process.

DETAILED DESCRIPTION

Figures 1, 2:
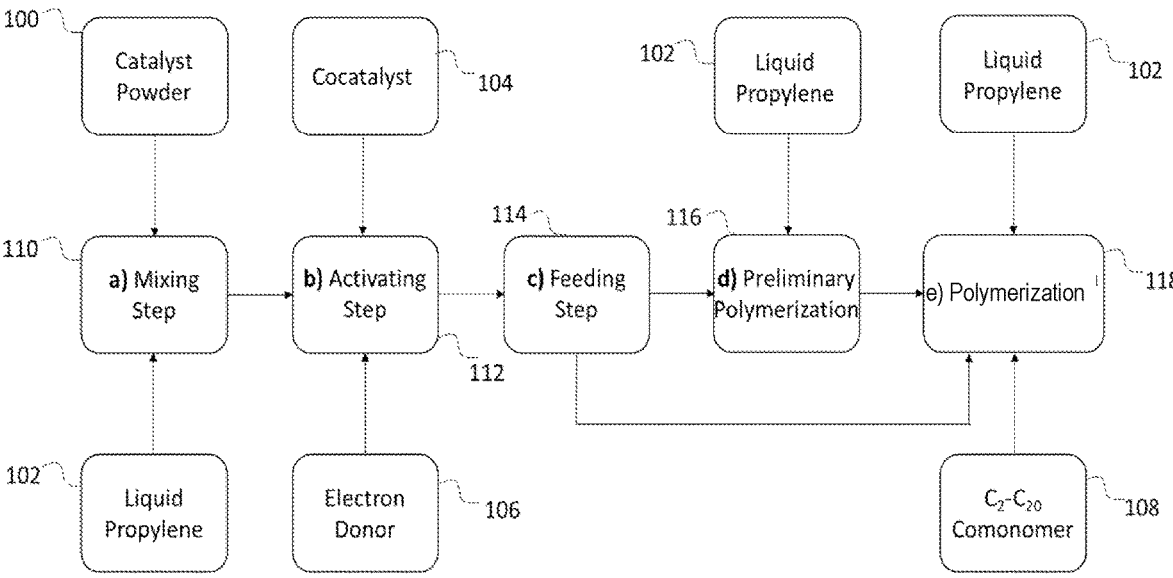
FIG. 1 is a flow diagram depicting a method of introducing a catalyst into a polymerization process, in accordance with one or more embodiments of the present invention.
FIG. 2 is a flow diagram depicting a method of introducing a catalyst into a polymerization process, in accordance with one or more embodiments of the present invention.

In one aspect, embodiments disclosed herein relate to processes for introducing a catalyst into a polymerization reactor. In one or more embodiments, methods in accordance with the present disclosure may involve mixing a catalyst with a polymerizable liquid to give a catalyst mixture that is free of any C20 or greater hydrocarbons, and then introducing the catalyst mixture into a polymerization reactor.

In another aspect, embodiments disclosed herein relate to apparatuses for performing polymerization processes. In one or more embodiments, apparatuses in accordance with the present disclosure may comprise a reactor in which a catalyst mixture is prepared, a bulk polymerization reactor, and a feeder that connects the reactor to the bulk polymerization reactor and feeds the catalyst mixture from the reactor into the bulk polymerization reactor.

Methods in accordance with the present disclosure may use mixtures of a catalyst and at least one polymerizable liquid as a means of introducing the catalyst into a polymerization reactor. Such methods may be advantageous over typical processes as they do not require the addition of catalytically-inert carriers such as olefinic waxes and mineral oils. These carriers can be detrimental to polymerization processes as they will contaminate the polymerized product unless an additional processing step to remove them is performed.

Methods in accordance with one or more embodiments of the present disclosure may comprise the steps of preparing a catalyst mixture, feeding the catalyst mixture into a polymerization reactor, activating the catalyst mixture, and performing a bulk polymerization.

In one or more embodiments, methods in accordance with the present disclosure may involve the following steps being performed in any suitable order. However, in many embodiments the production of a catalyst mixture is performed first, and the bulk polymerization of the polymerizable liquid is performed last. In one or more embodiments, the catalyst mixture may be activated either before or after the feeding of the catalyst mixture into the polymerization reactor. In one or more embodiments where a preliminary polymerization is performed, the preliminary polymerization may be performed after feeding the mixture into a polymerization reactor and either after or contemporaneously with the activation of the catalyst mixture.

Catalyst Mixing

In one or more embodiments, methods in accordance with the present disclosure may mix a catalyst with a polymerizable liquid to give a catalyst mixture. The mixing may be performed in any suitable vessel, such as a continuous stirred-tank reactor, a continuous-flow reactor, or a batch-stirred reactor. The catalyst may be transferred from a container or drum into the reactor by a carrier gas. In one or more embodiments, the gas used may be selected so that it any that does not react with, or otherwise degrade, the catalyst. In some embodiments the gas may be an inert gas such as nitrogen, argon, C1-C4 saturated hydrocarbons, and the like. To enable transferal of the catalyst, the gas may be introduced at a pressure that is positive relative to the container. Alternatively, the catalyst carrier may be a catalytically-inert liquid, such as saturated hydrocarbons like propane, butane, pentane, hexane, heptane, octane etc. The carrier liquid may be used in an amount of about 10% by weight or less, relative to the amount of polymerizable liquid.

In one or more embodiments, the polymerizable liquid may be any polymerizable species, or mixture of polymerizable species, that is in a liquid state. The temperatures, and pressures, recited herein may be modified and adapted to ensure that a polymerizable liquid remains in its liquid state until polymerization. In one or more embodiments, the polymerizable liquid may be selected from ethylene, propylene, 1-butene, 1-pentene, 1-hexene, 1-heptene, 1-octene, combinations thereof, and the like.

The polymerizable liquid may be introduced into the reactor before, after, or simultaneously with the catalyst. In some embodiments, the catalyst is introduced into the reactor first, and the polymerizable liquid is added second. The polymerizable liquid may be at a low temperature when it is introduced to the catalyst. In some embodiments, the polymerizable liquid is added at a temperature ranging from about 25° C. to about −48° C., or from about −10° C. to about −30° C. In other embodiments, the temperature of the polymerizable liquid may be range from about 25° C. to 0° C. In one or more embodiments, the weight of polymerizable liquid added is greater than that of the catalyst. In some embodiments, the weight of the catalyst ranges from about 10-30% by weight, relative to the weight of the polymerizable liquid. In other embodiments, the weight of the catalyst may range from about 1-50% by weight, relative to the weight of the polymerizable liquid. In further embodiments, the weight of the catalyst may range from about 10-80% by weight, relative to the weight of the polymerizable liquid.

The catalyst may be of any form that is suitable to be transferred. In one or more embodiments the catalyst may be a powder. In one or more embodiments, methods in accordance with the present disclosure may include any catalyst that is suitable for performing the desired polymerization. In some embodiments the catalyst may be a metallocene catalyst or a Ziegler-Natta catalyst.

The Ziegler-Natta and metallocene catalysts of one or more embodiments are not limited, at may be any Ziegler-Natta or metallocene catalyst known to one of ordinary skill in the art. The Ziegler-Natta catalyst may be a transition metal salt, wherein the transition metal is selected from group 4-12 metals. Some Ziegler-Natta catalysts may further be used with $MgCl_2$ and/or $TiCl_4$ and may comprise an internal electron donor selected from one or more of an aliphatic amine, amide, ester, ether, ketone, nitrile, phosphine, phosphoramide, thioether, thioester, aldehyde, alcoholate, or carboxylic acid. The metallocene catalyst of one or more embodiments may be a dichloride complex of the type $Cp*_2MCl_2$ were M is a transition metal such as Ti, Zr, and Hf, and Cp* is a substituted or unsubstituted cyclopentadienyl anion.

Catalyst Activation

In one or more embodiments, the catalyst mixture may be activated by the addition of one or more cocatalysts and, optionally, one or more electron donors. The activation may be performed at a temperature that is sufficiently low as to prevent polymerization of the polymerizable liquid by the activated catalyst. In one or more embodiments, the activation is performed at a temperature ranging from about 25° C. to about −48° C., or from about −10° C. to about −30° C. Performing the activation at a low temperature enables the activation to take place in the presence of the polymerizable liquid. This is distinct from other methods known in the art, wherein pre-contacting is generally a separate process that requires the use of inert compounds to control the pre-contacting time.

In one or more embodiments, methods in accordance with the present disclosure may include activation of the catalyst mixture by the addition of one or more cocatalysts. The cocatalysts are not particularly limited, and may be any suitably known in the art. In some embodiments, the cocatalyst may be one or more selected from the group consisting of alkylaluminums and alkylaluminoxanes.

The amount of cocatalyst used can depend on the type of catalyst employed but, in some embodiments, may be a molar ratio ranging from about 1:1 to 500:1, relative to the amount of catalyst. When the catalyst is a Ziegler-Natta catalyst, the cocatalyst may be used in a molar ratio ranging from about 1:1 to 150:1, or 1:1 to 10:1 relative to the amount of catalyst. When the catalyst is a metallocene catalyst, the cocatalysts may be used in a molar ratio ranging from about 1:1 to 500:1, or 1:1 to 200:1, relative to the amount of catalyst.

In one or more embodiments, methods in accordance with the present disclosure may include activation of the catalyst mixture by the addition of one or more electron donors. The electron donors are not particularly limited, and may be any that are suitably known in the art. In some embodiments, the electron donors may be a silane. The amount of electron donor used may depend on the type of catalyst employed. When the catalyst is a Ziegler-Natta catalyst, the electron donors may be used in a molar ratio ranging from about 0.1:1 to 150:1, 0.1:1 to 30:1, relative to the amount of catalyst.

In one or more embodiments, the activation of a catalyst mixture may be performed in any suitable reactor, such as a plug flow reactor. The activation may be performed with a short residence time, for instance, ranging from about 1-1800 seconds in some embodiments. In other embodiments, the residence time may range from about 1-600 seconds. The activated catalyst mixture may be continuously fed to a polymerization reactor.

Feeding

In one or more embodiments, the catalyst mixture or activated catalyst mixture may be fed into a polymerization reactor in a feeding step. The feeding may be performed by any suitable means, including through the use of one or more of a rotatory valve, a rotatory pump, a diaphragm pump, a screw pump or a piston pump. In some embodiments, additional polymerizable liquid may be added to the catalyst mixture to aid the feeding of the mixture to the polymerization reactor.

Polymerization

Methods in accordance with one or more embodiments of the present disclosure may comprise a polymerization step, wherein the polymerizable liquid is polymerized in a bulk polymerization process. In one or more embodiments, the polymerization may be performed in any suitable reactor. In one or more embodiments, additional polymerizable liquid may be added before or during the polymerization step. In some embodiments, the polymerization may be performed in the presence of hydrogen gas. The polymerization may result in the production of a polymerized product that is substantially free of C20 or greater hydrocarbon compounds. In one or more embodiments, the polymerized product may be free of C20-C30 hydrocarbon compounds, or other compounds that would result from contacting the catalyst mixture with one or more of mineral oils, greases, or olefinic waxes.

In one or more embodiments where propylene is the polymerizable liquid, the polymerization step may polymerize propylene to give a polypropylene homopolymer. In other embodiments, the polymerization step may polymerize propylene with one or more comonomers, producing a polypropylene copolymer. In one or more embodiments, comonomers in accordance with the present disclosure may be selected from the group consisting of ethylene and the C4-C20 α-olefins.

Preliminary Polymerization

Methods in accordance with one or more embodiments of the present disclosure may further comprise a preliminary polymerization step, wherein at least a portion of the polymerizable liquid is polymerized before the polymerization step. The preliminary polymerization may be performed in the same reactor as the polymerization step. In some embodiments, the preliminary polymerization may be performed in a different reactor to the polymerization step. In one or more embodiments, the polymerization may be performed in any suitable reactor, such as a continuous stirred-tank reactor, a continuous-flow reactor, a batch-stirred reactor, or a plug flow reactor.

In one or more embodiments, additional polymerizable liquid may be added before or during the preliminary polymerization. In some embodiments the preliminary polymerization may be performed in the presence of hydrogen gas. In some embodiments the preliminary polymerization may be performed at or below ambient temperature, particularly at about 25° C. or less. In some embodiments, the preliminary polymerization may have a short residence time, particularly of about 80 minutes or less.

In one or more embodiments where propylene is the polymerizable liquid, the preliminary polymerization may polymerize propylene. In some embodiments, the preliminary polymerization step polymerizes propylene to give a polypropylene homopolymer. In other embodiments, the preliminary polymerization polymerizes propylene with one or more comonomers, producing a polypropylene copolymer. In one or more embodiments, comonomers in accordance with the present disclosure may be selected from the group consisting of ethylene and the C4-C20 α-olefins.

Representative Methods

A method of introducing a catalyst into a polymerization reactor, in accordance with one or more embodiments of the present disclosure, is depicted by FIG. 1. Therein, a catalyst 100 is transferred from a container or drum into a reactor 110. A polymerizable liquid 102 is also introduced into the reactor 110 and mixed with the catalyst to give a catalyst mixture. As discussed above, the polymerizable liquid may be introduced at a low temperature in preparation of the activation step and to limit any potential reaction with the catalyst.

The catalyst mixture is subsequently activated 112 by the addition of one or more cocatalysts 104 and, optionally, one or more electron donors 106. As discussed above, the activation may be performed at a low temperature to limit instantaneous polymerization of the polymerizable liquid. At least a portion of the activated catalyst mixture may then be fed 114 into a polymerization reactor 116. A preliminary polymerization may be performed on the portion in the reactor, in some embodiments with a short residence time and at ambient or lower temperatures. Additional polymerizable liquid 102 may be added to the reactor before or during the preliminary polymerization 116.

The catalyst mixture that was not subjected to the preliminary polymerization is then fed 114 into a reactor where a bulk polymerization is performed 118. If the polymerization 118 reactor is different to that in which the preliminary polymerization 116 is performed, then the partially polymerized mixture is also fed from the preliminary polymerization reactor 116 into the polymerization reactor 118. However, it is understood that the reactor where bulk polymerization is performed 118 may be the same reactor in which the preliminary polymerization 116 is performed, in which case, additional catalyst mixture, polymerizable liquid 102 and comonomers 108 may be optionally added to the reactor following prepolymerization. In some embodiments, additional polymerizable liquid 102 may be added to the reactor before or during the polymerization 118. In some embodiments, one or more comonomers 108 may be added to the reactor before or during the polymerization 118.

Another method of introducing a catalyst into a polymerization reactor in accordance with one or more embodiments of the present disclosure, is depicted by FIG. 2. As detailed above, a catalyst 200 is transferred from a container or drum into a reactor 210. A polymerizable liquid 202, which may be at a low temperature, is also introduced into the reactor 210 and mixed with the catalyst to give a catalyst mixture. The catalyst mixture may subsequently be fed 212 into a reactor 214. The catalyst mixture may then be activated by the addition of one or more cocatalysts 204 and, optionally, one or more electron donors 206. At least a portion of the activated catalyst mixture may then be subjected to a preliminary polymerization 216. Additional polymerizable liquid 202 may be added to the reactor before or during the preliminary polymerization 216. The remaining activated catalyst mixture 214 and the mixture that has been subjected to preliminary polymerization 216 are combined and a bulk polymerization is performed 218. The polymerization 218 may be performed in a reactor that is the same or different to the one in which the preliminary polymerization is performed. In some embodiments, additional polymerizable liquid 202 may be added to the reactor before or during the polymerization 218. In some embodiments, one or more comonomers 208 may be added to the reactor before or during the polymerization 218.

Figure 3:
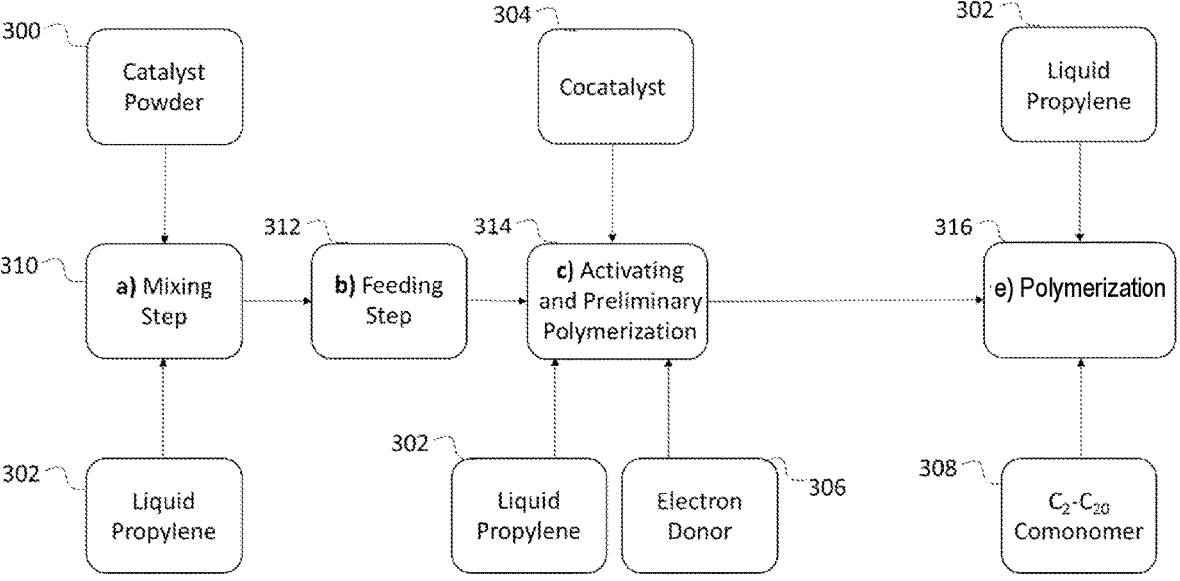
FIG. 3 is a flow diagram depicting methods of introducing a catalyst into a polymerization process, in accordance with one or more embodiments of the present invention.

A third method of introducing a catalyst into a polymerization reactor in accordance with one or more embodiments of the present disclosure, is depicted by FIG. 3. As detailed above, a catalyst 300 is transferred from a container or drum into a reactor 310. A polymerizable liquid 302, which may be at a low temperature, is also introduced into the reactor 310 and mixed with the catalyst to give a catalyst mixture. The catalyst mixture may subsequently be fed 312 into a reactor 314. The catalyst mixture may then be activated by the addition of one or more cocatalysts 304 and, optionally, one or more electron donors 306, while instantaneously performing a preliminary polymerization 314. Additional polymerizable liquid 302 may be added to the reactor before or during the combined activation and preliminary polymerization 314. The resulting mixture is subjected to a bulk polymerization a bulk polymerization is performed 316. The polymerization 316 may be performed in a reactor that is the same or different to the one in which the activation and preliminary polymerization 314 is performed. In some embodiments, additional polymerizable liquid 302 may be added to the reactor before or during the polymerization 216.

In some embodiments, one or more comonomers 308 may be added to the reactor before or during the polymerization 318.

Systems

Systems in accordance with one or more embodiments of the present disclosure may be capable of being used, or adapted to be used, in any of the methods detailed above.

In one or more embodiments, systems in accordance with the present disclosure may comprise a reactor for preparing a catalyst mixing, a catalyst feed that feeds a catalyst into the reactor, and a polymerizable liquid feed that feeds a polymerizable liquid into the reactor. The system may also comprise one or more bulk polymerization reactors and a feeder that may feed the catalyst mixture from the reactor into the polymerization reactor. The components of the systems described herein may be in accordance with those previously detailed in the present disclosure.

Systems are depicted by FIGS. 4A-D that can perform a method of introducing a catalyst into a polymerization reactor, in accordance with the present disclosure. The systems depicted by FIGS. 4A-4D relate to one or more embodiments wherein the polymerizable liquid is propylene, but, as would be expected by one of ordinary skill in the art, could be adapted for use with other polymerizable liquids.

Figures 4A, 4B:
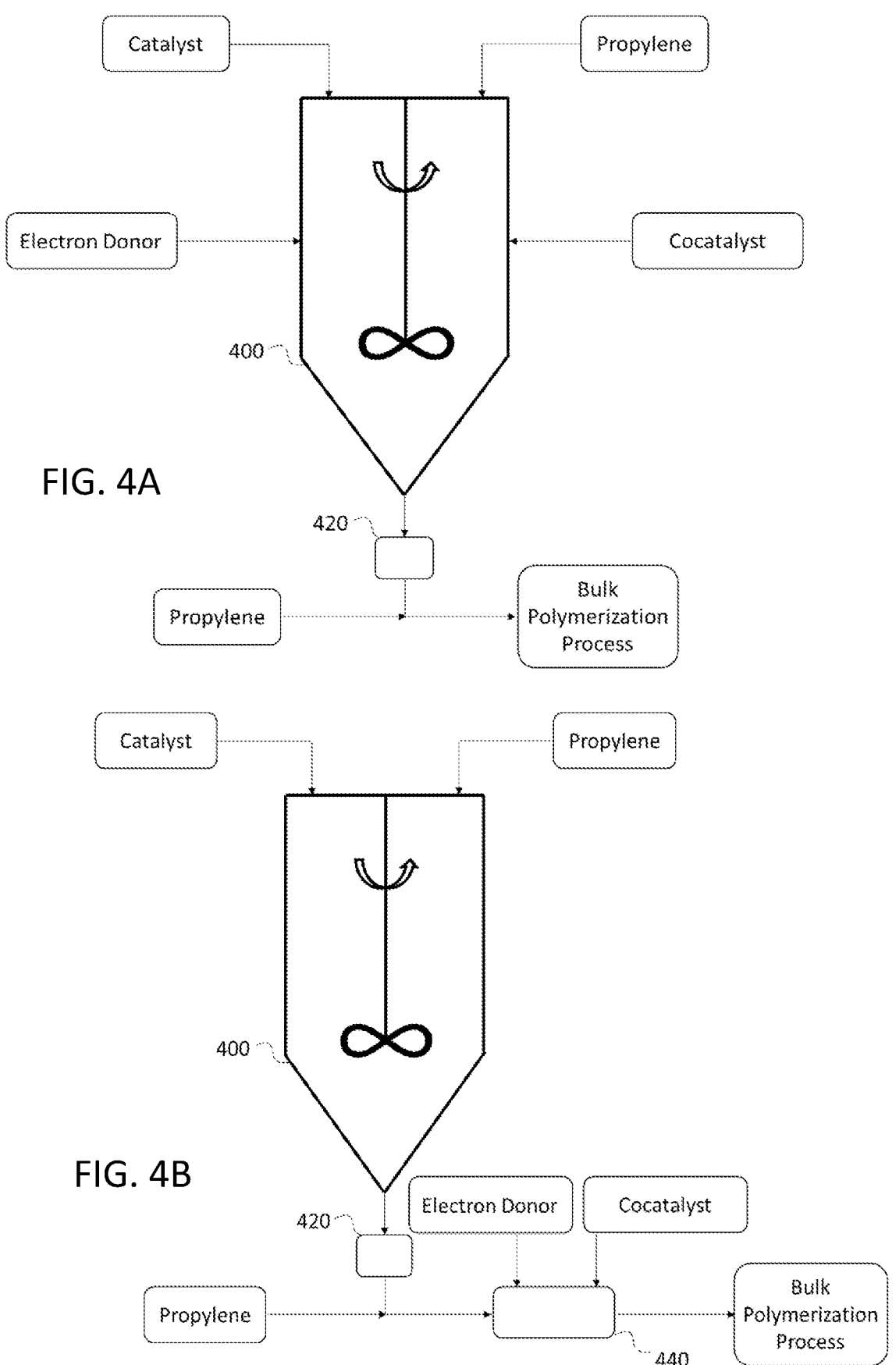
FIGS. 4A-D represent schematic views of apparatuses that are in accordance with one or more embodiments of the present invention.

A system for introducing a catalyst into a polymerization reactor, in accordance with one or more embodiments of the present disclosure, is depicted by FIG. 4A. The system may comprise a catalyst feed, a propylene feed, an electron donor feed and a cocatalyst feed, all of which may be connected to a reactor 400 for producing a catalyst mixture. The catalyst mixture may then be fed by a feeder 420 into a bulk polymerization reactor. The feeder 420 may be connected to a second propylene feed to aid the feeding process.

Another system for introducing a catalyst into a polymerization reactor, in accordance with one or more embodiments of the present disclosure, is depicted by FIG. 4B. The system may comprise a catalyst feed and a propylene feed, which may be connected to a reactor 400 for producing a catalyst mixture. The catalyst mixture may then be fed by a feeder 420 into a second reactor 440, which may be a continuous plug flow reactor and may be attached to an electron donor feed and a cocatalyst feed. The feeder 420 may be connected to a second propylene feed to aid the feeding process. The catalyst mixture may be activated in the second reactor 440 and then fed into a bulk polymerization reactor.

Figures 4C, 4D:
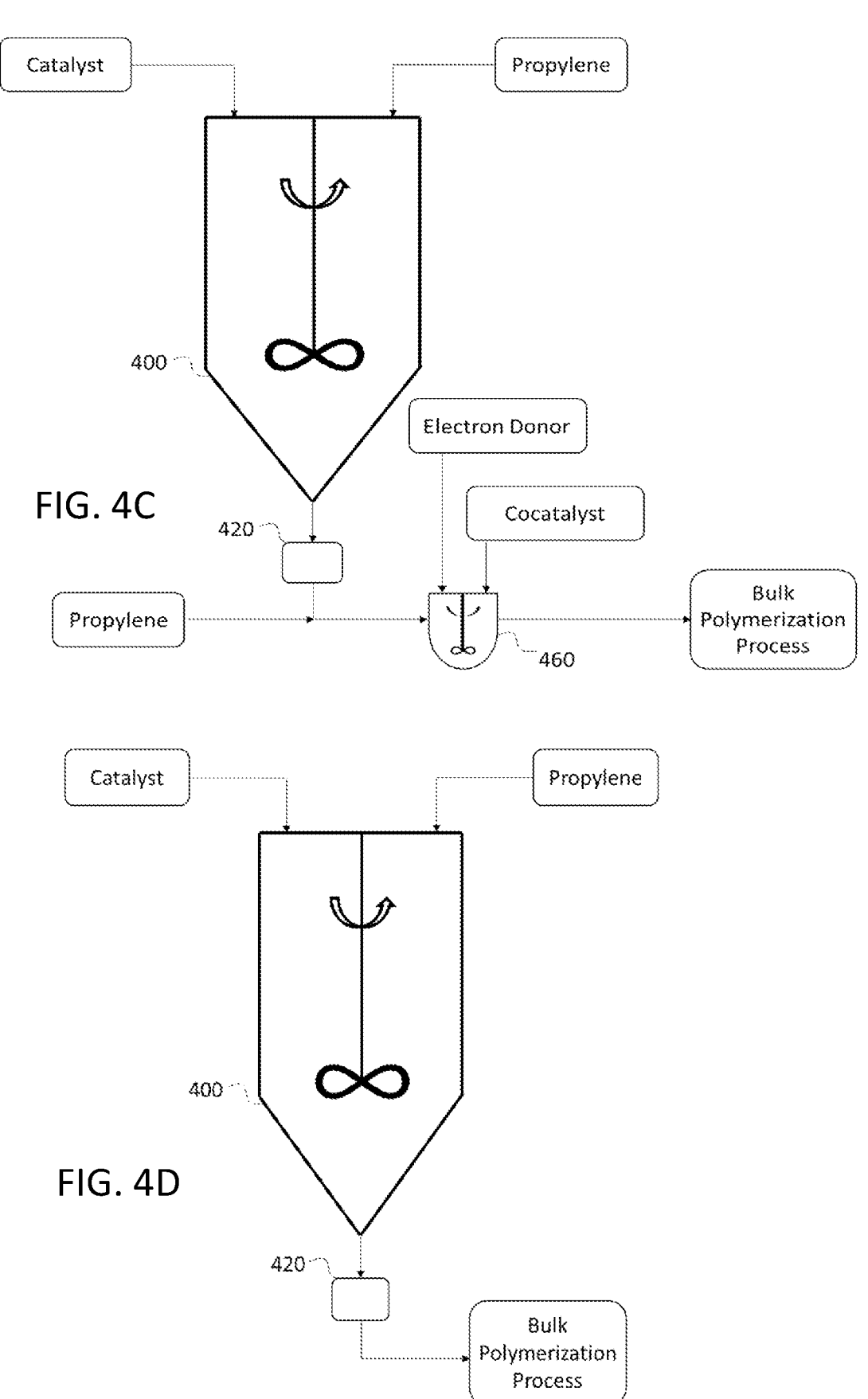

A third system for introducing a catalyst into a polymerization reactor, in accordance with one or more embodiments of the present disclosure, is depicted by FIG. 4C. The system may comprise a catalyst feed and a propylene feed, which may be connected to a reactor 400 for producing a catalyst mixture. The catalyst mixture may then be fed by a feeder 420 into a second reactor 460, which may be a continuous stirred-tank reactor and may be attached to an electron donor feed and a cocatalyst feed. The feeder 420 may be connected to a second propylene feed to aid the feeding process. The catalyst mixture may be activated in the second reactor 460 and then fed into a bulk polymerization reactor.

A fourth system for introducing a catalyst into a polymerization reactor, in accordance with one or more embodiments of the present disclosure, is depicted by FIG. 4D. The system may comprise a catalyst feed and a propylene feed, which may be connected to a reactor 400 for producing a catalyst mixture. The catalyst mixture may then be fed by a feeder 420 into a bulk polymerization reactor.

EXAMPLES

The following examples are merely illustrative and should not be interpreted as limiting the scope of the present disclosure.

Example 1

10.8 mg of a Ziegler Natta catalyst-mixture of diether and succinate as an internal donor were precontacted with a tri-ethylaluminum co-catalyst and a diisopropyldimethoxysilane external donor in 100 mL of hexane for 10 minutes at room temperature. The succinate was an example in accordance with European Patent Publication No. 2070954A1 and the diether was an example in accordance with Sever, J. R., Recent Developments in Supported Polyolefin Catalysts: A Review, *Multimodal Polymers with Supported Catalysts,* 2019, 1-53. The precontacted mixture was transferred to a 1 gallon steel bench scale reactor. After introducing the catalytic system, 1.2 kg of propylene at room temperature was added to the reactor and hydrogen was added until 1 bar of hydrogen partial pressure was reached. Upon stirring at 600 rpm, the mixture was heated at a temperature of 70° C. for 2 hours. In the stirred reactor the conditions of Table 1 were satisfied.

TABLE 1

| Conditions of Example 1 | |
| --- | --- |
| Al/Ti (molar) | 400 |
| Al/Do (molar) | 20 |
| Temperature (° C.) | 70 |
| Pressure (barg) | 30 |
| Hydrogen partial pressure (bar) | 1 |

After 2 hours, the reactor was depressurized to remove unreacted propylene and 655 g of polypropylene homopolymer was obtained. The obtained polypropylene has a Bulk density of 0.46 g/cm$^3$ and d(0.5) of 1974 microns.

Example 2

11.2 mg of Ziegler Natta catalyst mixture of diether and succinate as an internal donor and 1.2 kg of a propylene carrier were transferred at room temperature to a 1 gallon steel bench scale reactor. The mixture of catalyst/propylene was cooled to −10° C. and stirred at 600 rpm.

A tri-ethylaluminum co-catalyst and a diisopropyldimethoxysilane external donor were precontacted in 100 ml of hexane for 5 minutes at room temperature and added to the reactor. Hydrogen was transferred until a 1 bar partial pressure of hydrogen was reached. The mixture was heated at 70° C. for 2 hours. In the stirred reactor, the conditions of Table 2 were satisfied.

TABLE 2

| Conditions for Example 2 | |
| --- | --- |
| Al/Ti (molar) | 400 |
| Al/Do (molar) | 20 |
| Temperature (° C.) | 70 |
| Pressure (barg) | 30 |
| Hydrogen partial pressure (bar) | 1 |

After 2 hours, the reactor was depressurized to remove unreacted propylene and 663 g of polypropylene homopolymer was obtained. The obtained polypropylene has a bulk density of 0.39 g/cm$^3$ and d(0.5) of 2073 microns.

Table 3 presents the use of cold propylene as catalyst carrier performance comparing to the use of hexane as inert carrier for the polymerization:

TABLE 3

| Comparison of Propylene versus Hexane | |
| --- | --- |
| Catalyst Carrier | Catalyst yield (kgPP/gcatalyst) |
| Cold Propylene | 59.0 |
| Hexane | 60.6 |

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A system for a bulk polymerization process, the system comprising:

a first reactor configured to prepare, in the absence of cocatalyst and electron donor, at a temperature of room temperature to −48° C. and a pressure sufficient to ensure the presence of liquid propylene, a catalyst mixture, comprising unreacted liquid propylene and free of C20 or greater hydrocarbons, a catalyst feed that feeds a catalyst into the first reactor, a first propylene feed that feeds liquid propylene into the first reactor, a second reactor configured to activate the catalyst mixture by the addition of a cocatalyst, an electron donor, and liquid propylene at temperature sufficiently low to as to not polymerize or prepolymerize the propylene, wherein the second reactor is either a continuous stirred-tank reactor or a continuous plug-flow reactor;

a first feeder transferring the catalyst mixture from the first reactor into a second reactor, a cocatalyst feed that feeds the cocatalyst into the second reactor, an electron donor feed that feeds the electron donor into the second reactor, a second liquid propylene feed that feeds liquid propylene into the first feed or the second reactor, a bulk polymerization reactor, and a second feeder that connects the second reactor to the bulk polymerization reactor and feeds the catalyst mixture from the second reactor into the bulk polymerization reactor.

2. The system of claim 1, wherein the first reactor is selected from the group consisting of a continuous stirred tank reactor, a continuous plug flow reactor, and a batch-stirred reactor.

3. The system of claim 1, wherein the catalyst feed uses an inert gas to feed the catalyst into the first reactor.

4. The system of claim 1, wherein the catalyst is a catalyst powder.

5. The system of claim 4, wherein the catalyst powder comprises either a Ziegler-Natta catalyst powder or a met-allocene catalyst powder.

6. The system of claim 1, wherein the liquid propylene in the first reactor is at a temperature of about room tempera-ture to −48° C.

7. The system of claim 6, wherein the liquid propylene in the first reactor is at a temperature of 0° C. to −20° C.

8. The system of claim 1, wherein the first feeder or second feeder is at least one of a group consisting of a rotatory valve, a rotatory pump, a diaphragm pump, a screw pump, and a piston pump.

9. The system of claim 1, further comprising at least one monomer feed that feeds monomer into the bulk polymer-ization reactor.

10. The system of claim 1, wherein the liquid propylene in the second reactor is at a temperature of about room temperature to −48° C.

11. The system of claim 10, wherein the liquid propylene in the second reactor is at a temperature of 0° C. to −20° C.

* * * * *